INVENTOR.
MARION KOSEM

United States Patent Office 3,546,559
Patented Dec. 8, 1970

3,546,559
DIGITAL FINE AND COARSE CONTROL WHEREIN THE COMMAND AND POSITION FEEDBACK ARE COMPARED IN SERIAL FASHION
Marion Kosem, Willoughby Hills, Ohio, assignor, by mesne assignments, to Allen-Bradley Company, Milwaukee, Wis., a corporation of Wisconsin
Filed May 2, 1968, Ser. No. 725,992
Int. Cl. G05b 11/18
U.S. Cl. 318—594                     5 Claims

ABSTRACT OF THE DISCLOSURE

In a system wherein the motion of a machine tool is controlled by comparing, for each axis, the present location of the machine tool with a desired commanded location and generating error signals responsive to any difference between the two, this invention provides an arrangement including fine and coarse position command dynamic counters, fine and coarse position feedback dynamic counters wherein the command and feedback signals are serial digital numbers and the comparison is made in serial fashion. The fine and coarse arrangement allows for obtaining comparison samples at a higher rate than was previously possible whereby more accurate control as well as higher operating speeds are made possible.

BACKGROUND OF THE INVENTION

Field of the invention

This invention relates to numerical machine tool control systems and more particularly to an improvement therein.

In an application for patent for a numerical control system by this inventor, Ser. No. 654,887, filed July 20, 1967, there is described an absolute positioning system of a type wherein a command counter is used to store absolute command information or the end location desired for the machine tool, a feedback counter contains the instantaneous position of a machine tool, and a reference counter serves as the absolute reference for the system. The command and feedback counter states are compared and the machine tool is commanded to move until their count states are identical. The command, feedback and reference counters are dynamic; that is, they are continuously running in response to a common clock. All information accordingly is stored in phase form. For a multiple axis system, one command and one feedback counter are required per axis; however, only one reference counter is required per system.

One basic disadvantage of the briefly described system is the fact that the time required to process the input data is a direct function of the counter length. For example, a 100-inch system with a 0.0005-inch resolution requires counter lengths of $4 \times 10^5$. This results in a 0.4-second period for the reference counter and a 5 sample per second coarse sampling rate. It is this coarse sampling rate which is required to establish the sign of the error. The total time resulting from the 0.4-second reference counter period and the 5 sample per second coarse sampling rate limits the rate at which the data can be processed by the control system. Extending the system resolution to 0.0001 inch results in further time restrictions.

An object of this invention is to provide an arrangement wherein the time to process the input data is reduced considerably.

Another object of this invention is to provide an improved system of the type described wherein more samples per interval of time may be obtained, which affords an improvement in operating control.

Yet another object of the present invention is to provide a novel and improved numerical control sampling system.

SUMMARY OF THE INVENTION

The foregoing and other objects of the invention are achieved in a numerical control system of the type briefly described by dividing the command counter and the feedback counter into smaller capacity counters. Each of the command counter smaller capacity counters is driven at the clock frequency rate. Each of the feedback counter smaller capacity counters is driven at the clock frequency rate plus or minus the error signal. Accordingly, the smaller capacity counters will fill within a much shorter interval and output samples can be derived for comparison to determine the difference between the commanded and actual position at a much shorter interval.

DESCRIPTION OF THE PREFERRED EMBODIMENT

This invention is directed to an improvement in apparatus which receives commands, which are stored in the form of encoded numbers recorded on any suitable medium, such as punched paper tape, and which converts these commands into the proper signals for controlling the operation of a machine tool which carries out these commands. Since the apparatus for reading the stored command information from the storage, such as punched paper tape, converting that information into a suitably representative signal pattern, and transferring that signal pattern into a register or a counter, together with all the other associated functions used with numerically controlled machine tools, may be the same for this apparatus as they are for others, the details of these will not be described.

Figure 1:
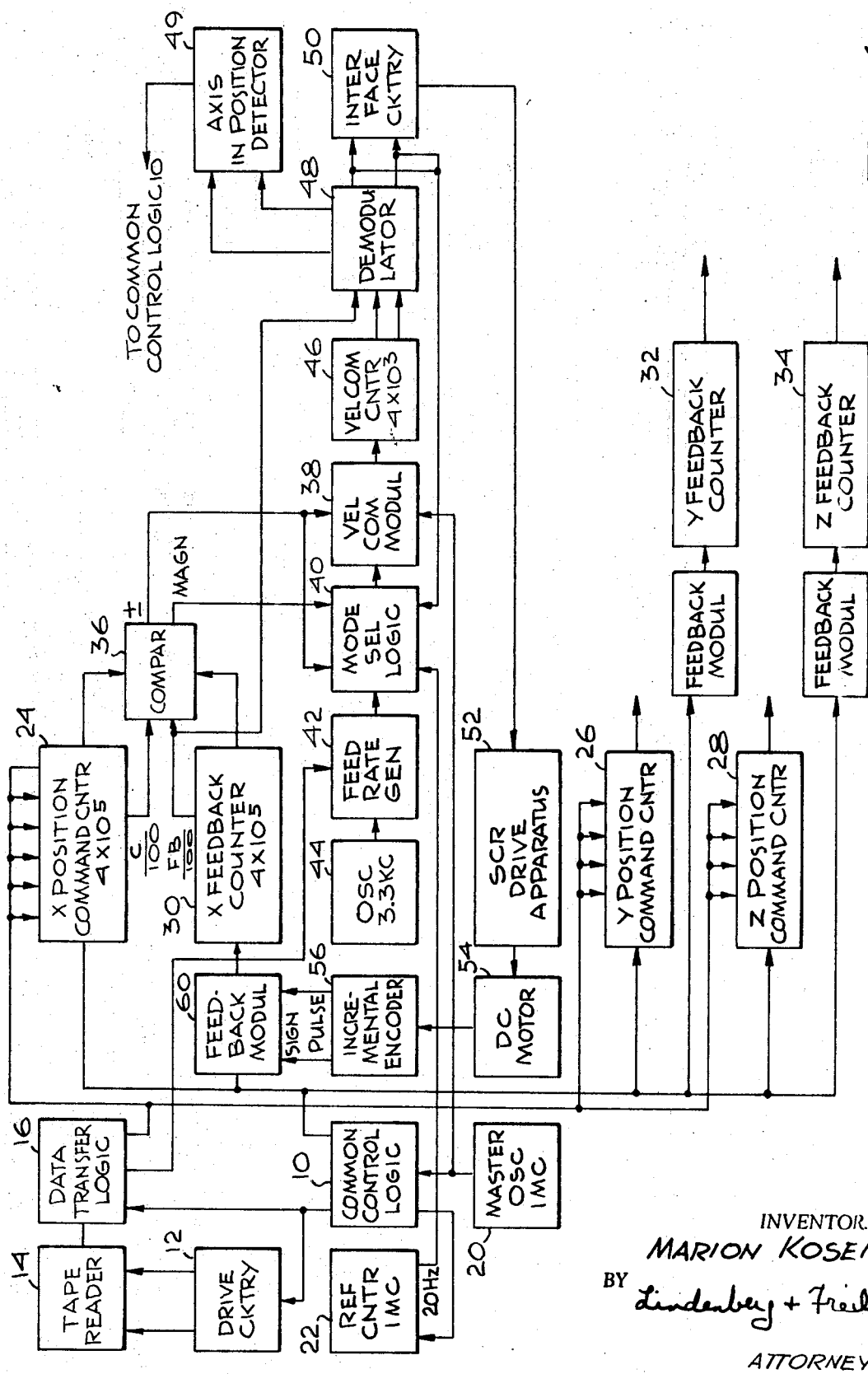
FIG. 1 is a block schematic diagram of a system over which the present invention constitutes an improvement.

FIG. 1 is the same as FIG. 1 of the aforementioned application for a Numerical Control System by this inventor, Ser. No. 654,887, filed July 20, 1967. This drawing is being reproduced and an explanation thereof provided for the purpose of enabling an understanding of this invention, which is an improvement over the one shown in FIG. 1.

A rectangle 10, labeled "common control logic," performs the function of enabling tape reader drive circuitry 12, to advance tape on which numerical control data is recorded whereby a tape reader 14 can provide a pattern of output signals which represents instructions or commands to a numerically controlled machine tool system. These are the usual instructions as to which tool is to be used, the feedrate instructions, lubricant instructions, and instructions indicative of the end point location to which it is desired to move the machine tool table from the present location. The latter instructions are the ones with which this invention is concerned. The instructions, which are usually converted to a pattern of electrical signals, are entered into circuitry 16, designated as "tape data transfer logic." This constitutes an arrangement of gates and registers which, under the control of the common control logic 10, stores some of this data for use during and after the machine tool motion and also transfers some of this data into other equipment which immediately commences operation in response thereto.

As thus far described, the structures are those of the prior art and are presently in use in numerical control apparatus which is commercially available. In accordance with this invention, there is provided a master oscillator 20 which, by way of example, produces oscillations at a one megacycle frequency. There is also provided a reference counter 22 which serves the function of being an absolute reference for the system. Its output may be used for indicating the time for the occurrence of operations other than that of moving the machine tool table.

GENERAL DESCRIPTION OF OPERATION

At the outset, there is entered into the respective axis position command counters 24, 26, 28 a number representing the end location desired for the machine tool table. The feedback counter 30, 32, or 34 for each axis provides the present or instantaneous location of the machine tool table, and the table is commanded to move until the location number in the position command counter and the table position number in the feedback counter for each axis is the same. Thus, at the outset, in response to the data in the tape data transfer logic circuitry 16, each one of the position command counters respectively 24, 26, and 28 is forced into a count condition representative of the end location desired for the table. At that time, the feedback counter will contain the present location of the table. It should be appreciated that this starting position need not be 0, 0, 0.

The length of these counters is dependent on the maximum dimension and desired positioning accuracy. For example, for a 100-inch system and a 0.0005-inch resolution, a counter having a $4 \times 10^5$ count length is required. Assuming a one megacycle input rate into the counters, a five-cycle-per-second sampling rate results. Since this sampling rate is too low to be used directly by the servoelectronics, which are usually associated with moving a machine tool table, an effective error signal of a much higher sampling rate must be generated. The apparatus, which will henceforth be described, is duplicated for each axis.

A comparator 36 is used to compare the phase of the outputs from the position command counter 24 and the feedback counter 30. It should be appreciated that each axis requires its own comparator. The comparator makes a comparison of the last count output from the position command counter (C) and the last count output of the feedback counter (FB). The logical "not" form of these counts ($\overline{C}$ and $\overline{FB}$) is also provided. Also applied to the comparator from the respective position command counter and the feedback counter are the outputs of these counters which occur at respective counts C/100 and FB/100 and their logical "not" form $\overline{C}/100$ and $\overline{FB}/100$. Accordingly, assuming the counter is $4 \times 10^5$ counts in length and is being driven by a one megacycle per second signal, the C signal will occur at 2.5 cycles er second and the C/100 signal will occur at 250 cycles per second. The time of occurrence of the FB and the FB/100 outputs is determined by how fast the machine tool table is moving as well as the direction of its motion. This will become more clear as this explanation progresses.

The comparator 36, which is composed of a coarse and a fine demodulator, makes a decision on every sample of the coarse demodulator (5 samples per second). If the distance to the desired end point for the machine tool table is indicated in the comparator as being greater than one inch (taken for illustrative purposes and not as a limitation on the invention), a constant level signal results. When the distance to the end point has been diminished to less than one inch, then the fine demodulator output (500 samples per second) of the comparator supplies a signal proportional to the actual error between the command and feedback counters. If overshoot occurs, an error signal of opposite polarity is generated to return this system to its commanded position. That output of the comparator which consists of sign information is applied to a velocity command modulator 38. Both sign and error signal magnitude information is supplied to a mode select logic arrangement 40.

A feedrate generator 42 has feedrate data entered therein from the tape data transfer logic 16 at the same time that position command data is entered into the position command counter 24. The feedrate generator 42 is driven in response to the output of a feedrate oscillator 44. The feedrate generator provides an output to the mode select logic 40 consisting of a pulse train occurring at a rate which is determined by the feedrate data word entered therein from the data transfer logic 16. Feedrate generator structure is well known in the numerical machine tool control field and appears in commercially sold machines. A suitable feedrate generator may be found described in detail and shown in a patent to P. H. McGarrell, No. 3,079,522. However, any of the well known arrangements for producing a pulse train at a rate specified by a feedrate number may be employed here.

The mode select logic circuitry 40 determines the source of pulses which are to be supplied to the velocity control loop for the machine tool table. These are applied through the velocity command modulator 38 to a velocity command counter 46, whose output is applied to a demodulator 48, whose output in turn is applied to the usual interface circuitry 50, normally comprising a digital-to-analog circuit which converts pulse width signals to analog drive signals. The output of the interface circuitry is applied to a silicon control rectifier drive system 52, whose output is used to drive a DC motor 54 attached to the machine tool table (not shown). An incremental encoder 56, in response to the rotation of the shaft of the motor, generates a pulse for every increment of motion and also a sign signal indicative of the direction or sign of the motion. The pulse train and sign information are supplied to a feedback modulator 64. The purpose of the feedback modulator is to add or subtract the pulses received from the incremental encoder 56 to or from the one megacycle oscillations received from the master oscillator 20 through the common control logic 10, depending on the direction of rotation of the shaft of the motor and thus the direction of motion of the machine tool table, as indicated by the sign signal. Thus, one megacycle pulses, plus or minus the pulses received from the incremental encoder, are applied by the feedback modulator 64 to drive the feedback counter 30 until it is in phase with the position command counter 24, as detected by the comparator 36.

In order to better explain the function of the mode select logic 40, an example will be postulated. Assume that the distance to the desired end point for the machine tool table is greater than one inch. The sign signal output of the comparator determines the sign of the input to the velocity command modulator 38. Since the actual distance to the end point is now greater than the "following error," represented by the demodulator 48 output, pulses from the feedrate generator are passed to the velocity command modulator. The following error is an indication of the distance the machine tool is behind the command pulse train. The following error, which is created at the demodulator 48 output is also used in determining the source of the driving signals whether feedrate or 20 Hz. signals are supplied to the circuitry which follows.

As the tool proceeds toward the end point, a point is reached when the distance to the end point is less than or equal to the following error. When this condition is detected, the feedrate generator output is blocked and the machine tool table then moves, both in response to inertia and to the 20 Hz. pulse train provided by the reference counter. A constant deceleration is produced, and the following error begins to get smaller. At this time, error integration is begun. This assures the fact that the tool will reach the commanded position.

The velocity at which the machine tool is first commanded to move is originally determined from the feedrate number stored on the tape. This determines the frequency of the pulses received from the feedrate generator.

In the feedrate mode of operation (the distance to the end point is greater than the following error), the feedrate pulses modulated on the one megacycle pulse create a phase shift in the velocity command counter. This counter has a count capacity corresponding to one inch. The output from this counter is compared by the demodulator 48 with a corresponding point in the feedback counter (FB/100), whereby a following error is created in the output of the demodulator 48. This following error, which is a digital signal, is then converted to a bipolar analog voltage by the interface circuitry 50. This bipolar analog voltage is then converted by the usual silicon control rectifier apparatus 52 to a motor drive signal.

The increment encoder 56 can include a disc having an inner and an outer circular track adjacent to each other and placed near the outer periphery. Each track may contain alternating black and white indicia or spaced holes. Also, the indicia on the inner track alternates with the indicia on the outer track. Photoelectric apparatus placed opposite each track is used to generate two pulse trains, say A and B, which for one direction of disc rotation have pulses of train A leading pulses of train B, and vice versa for reverse rotation of the disc. Well known logic converts these pulse trains into sign and pulse train signals as indicated. Devices of this sort are well known and are commercially purchasable. They are known as "incremental encoders" and are sold, for example, by the Trump-Ross Corporation, of Boston, Mass., or by the Dynamics Research Corporation, of Stoneham, Mass. Thus, the incremental encoder converts the analog position information into pulse train and sign form. The quantized shaft rotation is then used to generate the absolute actual position of the machine tool table at any time.

Reviewing briefly now the operation of the system, at the outset a number representing the end point location is introduced into the position command counter 24 which is set to that number. Feedrate data is also introduced into the feedrate generator. The output from the master oscillator is then permitted to be applied to the reference counter 22, the position command counter 24, the feedback modulator 64, and also the velocity command modulator 38. The feedback counter contains, at the outset, the present location of the machine tool table, while the position command counter contains, at the outset, the desired end location of the machine tool table. The comparator 36 compares the relative phase relationship of the position command counter and feedback counter and produces one output signal indicative of the fact that the distance to the end point is greater than a predetermined amount (for example, one inch) or a second signal (a series of pulses) indicative of the fact that the distance to the end point is less than one inch. The comparator also provides a signal indicative of the sign.

The feedrate generator produces pulses which, as long as the comparator output signal indicates that the distance to the end point exceeds the predetermined amount, are modulated on the output of the master oscillator and can then drive a velocity command counter. The velocity command counter is a cyclic counter having a count capacity representative of the predetermined amount (here one inch or $4 \times 10^3$). The output of this counter is compared in phase with the output of the feedback counter at the same count position ($4 \times 10^3$). The comparison is made by a demodulator 48. The output of the demodulator is then converted by the interface circuitry 50 to control signals for driving the motor which moves the machine tool table.

Incremental encoder apparatus 56 coupled to the motor generates a sign signal and a pulse train. The feedback modulator 64 adds the pulse train to or substracts it from the one megacycle signals being applied to drive the feedback counter 30.

As the machine tool table reaches a position which is less than the predetermined distance from the desired end position, mode select logic circuitry 40 blocks further pulses from the feedrate generator 42 from being applied to the velocity command counter. At this time error integration is determined by the 20 Hz signals from the reference counter 22.

When the count in the feedback counter and that in the position command counter are identical for each axis, the machine tool table has reached the designated position. At this time a signal is applied to the common control logic 10. The other instructions for the machine tool which are to be carried out when the machine tool table reaches a designated position may then be carried out. Thereafter, the tape reader and other circuits are energized to inject new counts into the respective position command counters and into the feedrate generator.

Figure 2:
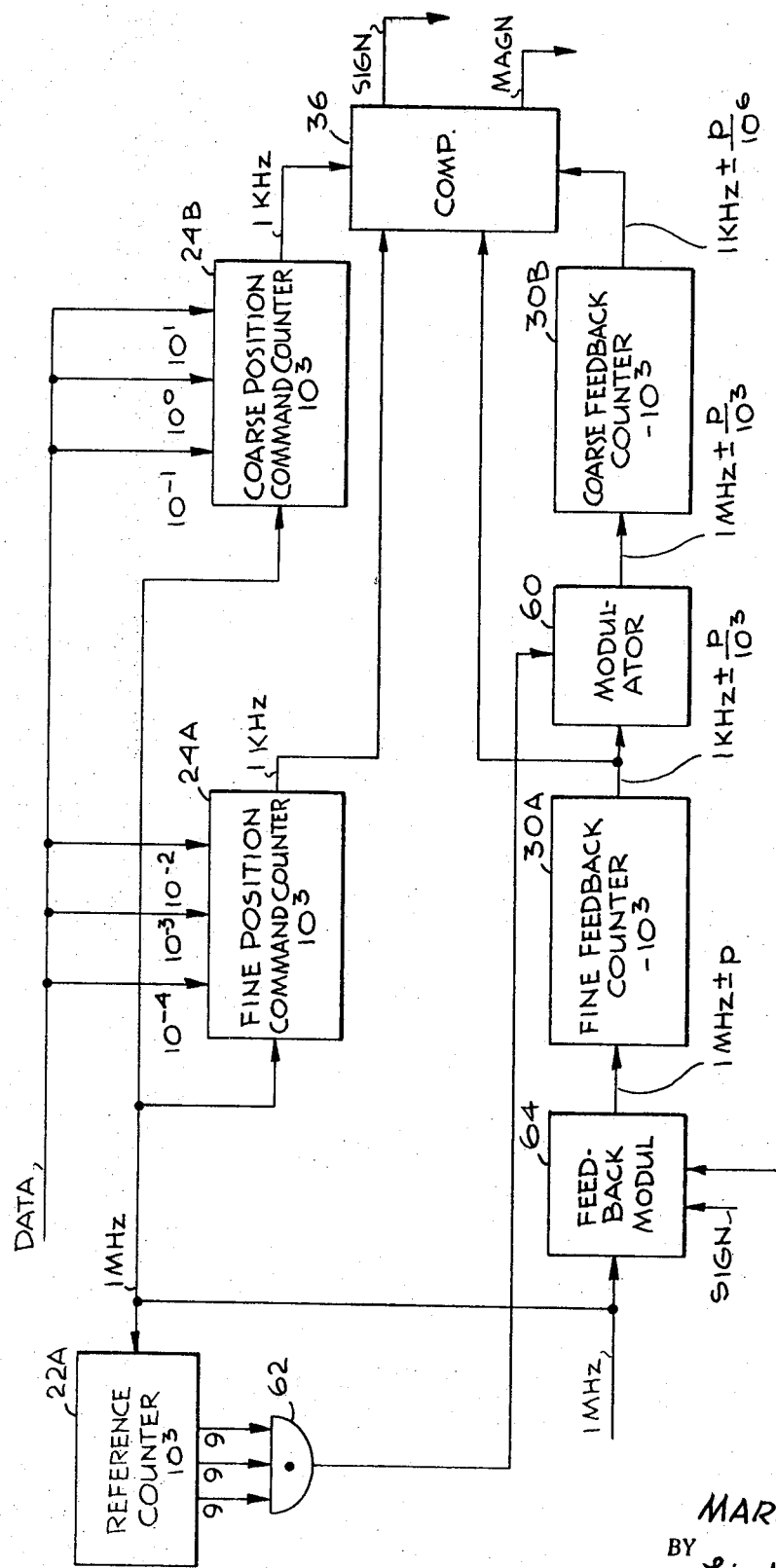
FIG. 2 is a block schematic diagram of the modifications of FIG. 1 which constitute the present invention.

FIG. 2 is a block schematic diagram of the modification of FIG. 1 which constitutes an embodiment of this invention. In accordance with this invention, in place of the position command counter 24, there is substituted a fine position command counter 24A and a coarse position command counter 24B. In place of the feedback counter 30 there is substituted a fine feedback counter 30A and a course feedback counter 30B. In addition, there is added a modulator 60. In place of the reference counter 22, there is provided a reference counter 22A, which has a total count capacity of $10^3$. An AND gate 62 produces an output for each 999 count of counter 22A. Since the counter is driven at a 1 mHz. rate, this represents a pulse train having a 999 kHz. frequency. The remaining structures shown in FIG. 2 are the same as those shown in FIG. 1 and bear the same reference numerals. These constitute the feedback modulator 64 and the comparator 36, and these are reproduced in order to show how the structure of FIG. 2 is connected into the structure of FIG. 1.

The fine position command counter 24A, coarse position command counter 24B, fine feedback counter 30A, and coarse feedback counter 30B are each given a count capacity of $10^3$. It should be understood that this is by way of exemplification and should not be considered as a restriction upon the invention, since those skilled in the art will readily appreciate how to alter the count capacity of these counters for altering the sampling rate.

The command counter, as illustrated, is made up of two sections of counters each of which has the count capacity of 1000. The input frequency to each is 1 mHz. Continuing with the example, with these 1000 count capacity counters, one can handle a system having 100 inches total moving distance, with a 0.0001-inch resolution. With the system previously described, to obtain a 100-inch system with a 0.0005-inch resolution, a counter having a length of $4 \times 10^5$ was employed. With the previously described system, pulses were obtained at the output at the rate of 5 samples per second coarse sampling rate. The reference counter period was 0.4 second. The total time resulting from the reference counter period and the sampling rate indicated limits the rate at which data can be processed by the control system. An extension of the control system to have a resolution of 0.0001 inch would result in further restrictions if the prior system were followed. By making up the command counter of two 1000 count counters and driving each of them with an input frequency of 1 mHz., an output frequency is obtained from the fine and coarse position command counters of 1 kHz. If the phase of the 1 kHz. signal from the fine position counter is compared with a reference 1 kHz. signal, each one microsecond phase difference between the two counts has a weight of 0.0001 inch. This results from the fact that the least significant digit of the counter is $10^{-4}$ inches.

The least significant digit of the coarse command counter has a weight of $10^{-1}$ inches. Therefore, each one microsecond phase difference between the output of the counter, when compared with the reference 1 kHz. signal, has a weight of 0.1 inch.

It should now be evident that the command coordinate can be read out of the counters at a sampling rate of 1 kHz. This is 1000 times faster than in a system having one counter of a $10^6$ total length required for 100 inches at 0.0001-inch resolution. The coordinate is made up of two parts, as before, with no added complexity in electronics hardware.

The input signals to the fine feedback counter 30A are 1 mHz.$\pm p$, where $p$ represents *the* signals from the feedback transducer, as before, with the sign being determined by the direction of motion, as before. The output from the fine feedback counter therefore becomes 1 kHz.$\pm p/1000$. The second component of the frequency, namely $p/1000$, is the carry signal from the coarse feedback counter having a weight of 0.1 inch. Since the carrier frequency to the coarse command counter is 1 mHz., the input frequency to the coarse feedback counter should be 1 mHz.$\pm p/1000$. This latter frequency is synthesized by adding 999 kHz. to the 1 kHz.$\pm p/1000$ from the output of the fine feedback counter. The synthesis is achieved by applying the outputs of the reference counter 22A which occurs when the counter is in its 999 kHz. count state to an AND gate 62 whose output is applied at that time to the digital modulator 60. The digital modulator in well known fashion adds or subtracts a pulse from the 999 kHz. pulse train depending on the sign of the modulating pulse train. Thus, the digital modulator combines the 1 kHz.$\pm p/100$ signal with the 999 kHz. signal to produce an output of 1 mHz.$\pm p/10^3$. This is applied to the coarse feedback counter 30B to drive it through its count cycle. The output of the coarse feedback counter is 1 kHz.$\pm p/10^6$. This output is applied to the comparator 36 to be compared with the output of the coarse position command counter in phase.

The comparator generates the error sign which is used by the velocity command modulator 46 and the magnitude used by the mode select logic 40 to control the feedrate. The output of the comparator is a DC level which exists until the difference between the command and feedback counters is diminished to within 0.4 inch. Within the 0.4 inch distance, the magnitude output from the comparator is a signal proportional to the actual error.

An example will be given to illustrate the operation of the system and to point out the differences between this invention and the arrangement described in the previously mentioned patent application Ser. No. 654,887.

When the control system is essentially started, all counters are reset simultaneously. This establishes a zero error condition within the control system. The command counter is never turned off for data insertion. The command counter is merely reset between the input clock pulses. Data is then entered between clock pulses. After the data has been entered into the command counter, the sign of the difference is established and the execution of the commanded move is started. The velocity counter is modulated by the feed pulses until the fine command counter and the velocity counter are in phase within the last 0.4 inch of the end point. At this time, the feed pulses are terminated and the following error "closes in" toward the end point. As the commanded block of data is executed, the control system is ready to receive another block of data from the input medium.

If faster data processing is required, less than three digits can be grouped together. If a larger coordinate is to be accommodated, more sections can be added to the counter length.

From the foregoing description it will be seen that by dividing the command and feedback counters and by driving the divided command counters in parallel from the same source as the reference counter, and further by effectively driving the divided feedback counters from essentially the same driving source, one is able to obtain more samples within a given interval from the counter whereby one can determine at more points over a commanded path the location of the machine tool relative to a desired end point. This in turn enables one to more closely control the travel of the machine too whereby not only is a better result achieved but the likelihood of errors is reduced and the machine tool can be made to operate with a greater degree of accuracy.

Although particular embodiments of the invention have been described and illustrated herein, it is recognized that modifications and variations may readily occur to those skilled in the art, and consequently it is intended that the claims be interpreted to cover such modifications and equivalents.

The embodiments of the invention in which an exclusive property or privilege is claimed are defined as follows:

1. In a system for directing a numerically controlled machine tool to move from a first position to a second position in response to a numerical word representing said position, and wherein each position along each coordinate axis is specified by a numerical word, said system having for each axis a plurality of feedback counter means for providing outputs representative of the first position of said machine tool, each feedback counter means having an output of different numerical significance.

an equal plurality of command sounter means, each command counter means having an output of numerical significance corresponding to a respective one of said feedback counter means, means responsive to a numerical word representative of a second position for placing said plurality of command counter means into count states representative of said second position.

means for comparing predetermined count outputs of like numerical significance of said plurality of command and plurality of feedback counters to produce a comparator output signal indicative of any difference in said outputs, means responsive to said comparator output signal for enabling motion of said machine tool toward said second position, means for changing the count of each of said plurality of command counter means at a first rate, and means for changing the count of each of said plurality of feedback counter means at a second rate determined by said first rate, the extent of machine tool motion, and the numerical significance of its output.

2. A system as recited in claim 1 wherein said means for changing the count of said plurality of command counter means at a first rate comprises a source of oscillations, and means for applying oscillations from said source to each one of said plurality of counter means, and wherein the means for changing the counts of said plurality of feedback counter means includes means for generating a pulse for each increment of machine tool motion, means for generating a sign signal indicative of the direction of machine tool motion, means for combining oscillations from said source and pulses representative of increments of machine tool motion in accordance with the sign signals to produce a first pulse wave train, means for applying said first pulse wave train to a first of said plurality of feedback counter means to cause it to sequence through its count states, means for generating oscillations at a second frequency, means for combining the oscillations at said second frequency with the output from the last stage of said first of said plurality of feedback counter means to produce a second pulse train, and means for driving a second of said plurality of feedback counter means with said second pulse train.

3. In a system wherein a numerically controlled machine tool is directed to move from a first position to a second position in response to a numerical word representing said second position, and wherein each position along each coordinate axis is specified by a numerical word, and wherein for each axis there is provided a single feedback counter having a predetermined count capacity and including means for providing an output representative of the first position of said machine tool, a single command counter having the same count capacity as said feedback counter, means responsive to a numerical word representative of a second position for placing said command counter into a count state representative of said second position, means for comparing the predetermined count outputs of said command and feedback counters to produce a difference signal indicative of a difference in said outputs, means responsive to the difference signal output of said means for comparing for enabling motion of said machine tool in the presence of said difference signals, oscillator means for changing the count of said command counter at a first rate, and modulator means for changing the count of said feedback counter at a second rate determined by said first rate and the extent of machine tool motion, the improvement in said system comprising in place of said single command counter at least two command counters having outputs of different numerical significance which together represent the count capacity of said single command counter, means driving each of said two command counters from said oscillator means for changing the count of said two command counters at the same rate, in place of said single feedback counter at least two feedback counters having outputs of different numerical significance which together represent the count capacity of said single feedback counter, and means for changing the count of each of said two feedback counters at a rate determined by the rate of change of the count of each of said two command counters, the extent of machine tool motion, and the numerical significance of its output.

4. A system for directing a numerically controlled machine tool to move from a first position to a second position in response to a numerical word representing said second position, and wherein each position along each coordinate axis is specified by a numerical word, said system comprising for each axis a first and a second feedback counter means, means for providing an output representative of the first position of said machine tool, first and second command counter means, means responsive to a numerical word representative of a second position for placing said first and second command counter means into count states representative of said second position, means for comparing predetermined count outputs of said first and second command counter means and said first and second feedback counter means to produce difference signals indicative of a difference in said outputs, a source of machine tool motion command signals, means for moving said machine tool responsive to said machine tool motion command signals, means responsive to said difference signals for enabling said machine tool motion command signals to be applied from said source to said means for moving said machine tool, means for generating a motion indicating signal responsive to each increment of motion of said machine tool, a first source of oscillations, means for applying oscillations from said source to said first and second command counter means to alter their counts responsive thereto, means for modulating oscillations from said source with said motion indicating signals, means for applying said modulated oscillations to a first of said feedback counter means to alter its count responsive thereto, a second source of oscillations having a frequency which when added to the frequency of the last output of said first command counter means equals the frequency of said first source of oscillations, means for combining oscillations from said second source of oscillations with the last output of said first feedback counter means to provide second modulated oscillations, means for applying said second modulated oscillations to said second feedback counter means to alter its count responsive thereto, and means for terminating the application of said motion command signals to said means for moving said machine tool responsive to said difference signals attaining a predetermined minimal value.

5. In a system for directing a numerically controlled machine tool to move from a first position to a second position in response to a numerical word representing said second position, and wherein each position along each coordinate axis is specified by a numerical word, said system having, for each axis, a plurality of feedback counter means for providing outputs of different numerical significance which together are representative of the first position of said machine tool, an equal plurality of command counter means having outputs of numerical significance corresponding to respective ones of said feedback counter means, means responsive to a numerical word representative of a desired second position to alter the states of said command counter means to represent said second numerical word, means for driving each of said plurality of command counter means through successive count states simultaneously and at the same rate, means for driving each of said plurality of feedback counter means at a rate determined by the rate said plurality of command counter means is driven modified by signals representative of both changes in machine tool position and the numerical significance of its output, means for comparing predetermined count outputs of like numerical significance of said plurality of command counter means and plurality of feedback counter means to produce a comparator output signal indicative of any difference in said outputs, and means responsive to comparator output signals for enabling motion of said machine tool toward said second position.

References Cited

UNITED STATES PATENTS 3,323,030   5/1967   Inaba et al. _____ 318—20.260
3,372,321   3/1968   Inaba et al. _____ 318—20.260

THOMAS E. LYNCH, Primary Examiner

U.S. Cl. X.R.

318—28

PO-1050
(5/69)

UNITED STATES PATENT OFFICE
CERTIFICATE OF CORRECTION

Patent No. 3,546,559    Dated December 8, 1970

Inventor(s) Marion Kosem

It is certified that error appears in the above-identified patent and that said Letters Patent are hereby corrected as shown below:

| | | |
|---|---|---|
| Column 3, Line 52, | "er" should be --- per --- |
| Column 7, Line 47, | "essentially" should be --- initially --- |
| Column 8, Line 18 | after "said" insert --- second --- |
| Column 8, Line 24 | "period (.)" should be --- comma (,) --- |
| Column 8, Line 25 | "sounter" should be --- counter --- |
| Column 8, Line 32 | "period (.)" should be --- comma (,) --- |

Signed and sealed this 29th day of June 1971.

(SEAL)
Attest:

EDWARD M. FLETCHER, JR.
Attesting Officer

WILLIAM E. SCHUYLER, JR
Commissioner of Patents